United States Patent [19]

Sarich

[11] 4,126,987

[45] Nov. 28, 1978

[54] MANUAL LINKAGE

[76] Inventor: David D. Sarich, P.O. Box 644, Davidson, Canada

[21] Appl. No.: 827,764

[22] Filed: Aug. 25, 1977

[51] Int. Cl.² .......................................... A01D 67/00
[52] U.S. Cl. ........................................ 56/208; 56/217
[58] Field of Search .................................. 56/208-217

[56] References Cited

U.S. PATENT DOCUMENTS

| 2,842,925 | 7/1958 | Allen | 56/208 |
|---|---|---|---|
| 2,972,847 | 2/1961 | Matthews, Jr. | 56/217 |
| 3,485,020 | 12/1969 | Soteropulos et al. | 56/217 |
| 3,717,983 | 2/1973 | Reitz et al. | 56/208 |
| 3,808,784 | 5/1974 | Gardner et al. | 56/208 |
| 4,009,555 | 3/1977 | Templie | 56/208 |

Primary Examiner—Louis G. Mancene
Assistant Examiner—Paul J. Hirsch
Attorney, Agent, or Firm—Rogers, Bereskin & Parr

[57] ABSTRACT

A control linkage is provided suitable for use on a swather. The linkage includes a housing, a hand lever pivotally coupled to the housing for angular movement about a first axis, and means adapted to pivotally mount the housing at a location for convenient use by an operator and for movement about a second axis perpendicular to the front axis. The hand lever includes a bracket having an attachment portion spaced transversely of the first axis in a direction lying generally along a second axis and a crank is attached to the housing and extends outwardly for arcuate movement when the hand lever is moved about the second axis. First and second control rods have ends attached respectively to said attachment portion and to said first crank and other ends attachable to a control mechanism coupled to the reel and table of the swather whereby movement of the hand lever about the second axis primarily controls the height of the table and reel and movement of the hand lever about the first axis primarily controls the height of the reel.

3 Claims, 5 Drawing Figures

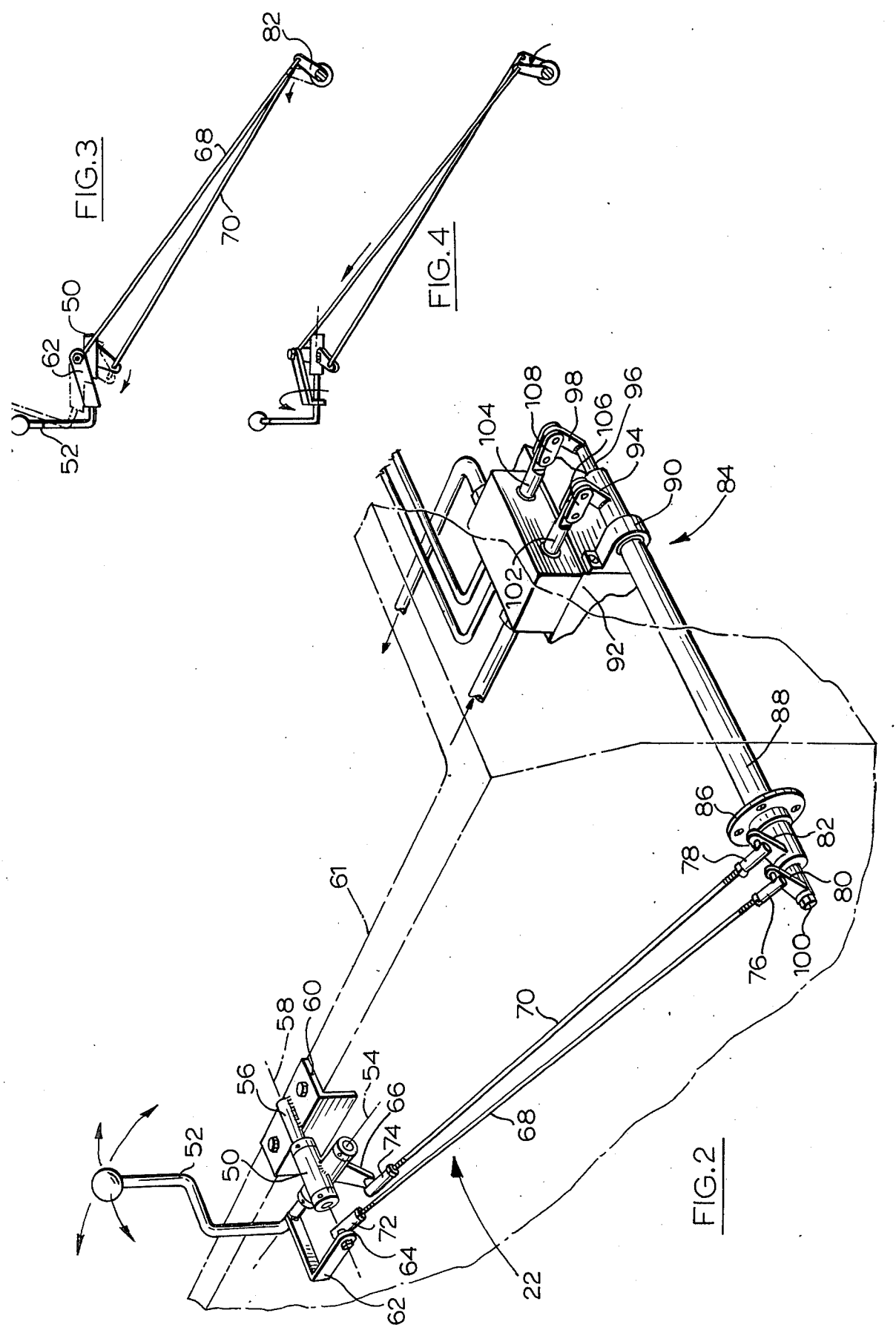

MANUAL LINKAGE

This invention relates to a control linkage and more specifically to a linkage used in controlling the reel and table of a swather during use of the swather.

Although the linkage of the present invention will be described specifically in use on a swather, it will be appreciated that the linkage can be used in many applications where two related functions are to be controlled simultaneously from a single hand lever.

A swather is a machine used to cut and then to lay crops in a continuous swath. The swather consists essentially of a drive unit having driven front wheels and a single offset rear wheel which is steerable. The operator sits on the machine looking forwardly and controls a reel and table which are suspended in front of the drive unit. In use, the height of the table must be adjusted to allow for undulations in the field, and the reel is maintained at a predetermined level above the table unless the crop height varies. Such height variation requires the reel to be moved vertically relative to the table. The table and reel heights are commonly controlled by the operator using two foot controls.

The present invention is intended to provide a single hand control for operating the reel height and table height contemporaneously as required.

A control linkage is provided suitable for use on a swather. The linkage includes a housing, a hand lever pivotally coupled to the housing for angular movement about a first axis, and means adapted to pivotally mount the housing at a location for convenient use by an operator and for movement about a second axis perpendicular to the front axis. The hand lever includes a bracket having an attachment portion spaced transversely of the first axis in a direction lying generally along a second axis and a crank is attached to the housing and extends outwardly for arcuate movement when the hand lever is moved about the second axis. First and second control rods have ends attached respectively to said attachment portion and to said first crank and other ends attachable to a control mechanism coupled to the reel and table of the swather whereby movement of the hand lever about the second axis primarily controls the height of the table and reel and movement of the hand lever about the first axis primarily controls the height of the reel.

An operator can be trained to use the hand lever and to learn the "feel" of this lever and the response it provides so that the operator will quickly learn to control both the reel and the table simultaneously with one hand movement.

The invention will be better understood with reference to the drawings, in which:

FIG. 2 is a perspective view of the control linkage and its association with a control mechanism, a portion of the swather being shown in ghost outline to illustrate the relationship of these parts relative to the swather;

FIGS. 3 and 4 illustrate the use of the control linkage; and

Figure 1:
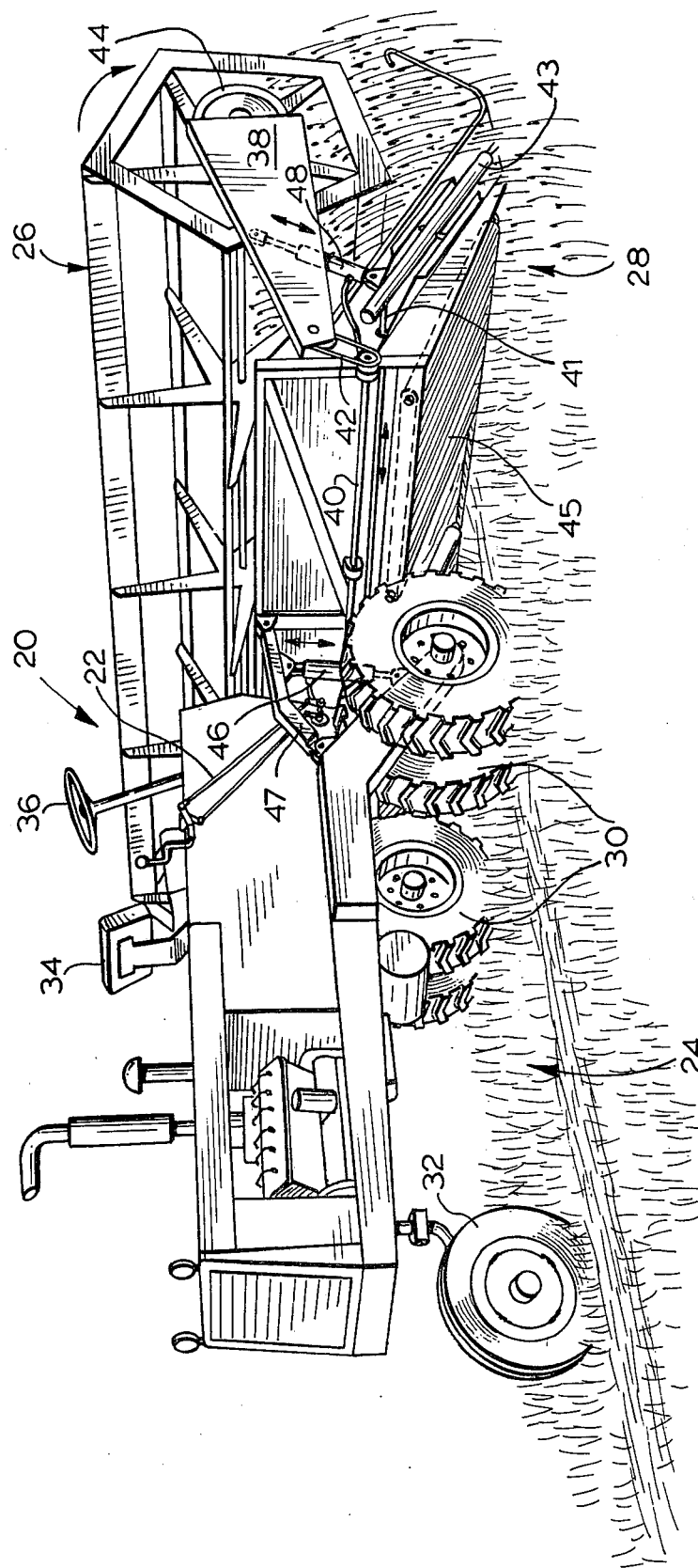
FIG. 1 is a perspective view of a swather incorporating a preferred embodiment of a control linkage, the swather being viewed generally from the rear and to one side.

The swather 20 includes a drive unit 24 carrying a reel 26 and a table 28. The unit 24 is somewhat diagrammatic and represents a conventional drive unit having pairs of driven wheels 30 and a steerable rear wheel 32 which is offset so that it does not interfere with a swath which is laid between the pairs of driven wheels 30. A driver or operator sits on a seat 34 facing forwardly and uses a steering wheel 36 as well as the control linkage 22.

When using the swather it is necessary to maintain the reel 26 and table 28 in the best position for cutting the crop. If the crop is of constant height, the table and reel must be moved vertically in unison as the swather passes over ground undulations. Also, if the crop varies in height, the reel must be moved to adjust the spacing between the reel and the table. Commonly both adjustments may have to be made contemporaneously. It is therefore necessary to be able both to elevate and to lower the reel and table continuously as the swather moves across a field.

The reel 26 is mounted on a pair of support arms 38 (one of which is shown) which are pivoted at their rearward ends, and the reel is driven from a shaft 40 by way of a belt 42 and a further belt within the arm 38 which drives a pulley wheel 44 on the axis of the reel 26.

The table 28 includes a crop cutter at its forward and lower leading edge, the cutter being driven from a recipricating rod 41 by way of a rocker arm 43. Also, the table includes a pair of transverse belts 45 (one of which is shown) and these belts are driven to carry cut crop towards the centre of the table where an opening allows the crop to fall to the ground to produce a swath between the driven wheels 30.

The table 28 and reel 26 are mounted conventionally from the drive unit 24. The mounting includes a pair of radius arms 47 (one of which is shown) pivotally connected to the unit 24 and to the table 28. A pair of hydraulic actuators 46 (one of which is shown) are mounted between the radius arms 47 and the unit 24 for elevating the table and the reel 26 simultaneously.

The elevation of the reel 26 in relation to the table 28 is controlled by a pair of actuators 48 (one of which is shown) and these actuators are mounted between the table 28 and the support arms 38 of the reel 26. Consequently, the actuators 48 can be energised to change the vertical spacing between the reel 26 and the table 28.

The control linkage 22 is associated with a control mechanism for selectively operating the pairs of actuators 46, 48. Initially, the control linkage 22 will be described more fully with reference to FIGS. 2, 3 and 4 and then the relationship of the control linkage to the actuators 26, 28 will be described with reference to FIGS. 2 and 5.

As seen in FIG. 2, the control linkage 22 includes a housing 50 having a cranked hand lever 52 mounted in the housing for movement about a first axis 54. The housing is coupled to a shaft 56 for movement about a second axis 58 and the shaft 56 is attached to a bracket 60 which together with the shaft 56 forms a connector for mounting the control linkage 22 on a side 61 of a cab or the like in which an operator sits to use the linkage. The hand lever 52 includes an L-shaped bracket 62 which terminates in an attachment portion 64 lying generally in alignment with the axis 58 as drawn in FIG. 2. In general, the attachment portion is spaced transversely of the first axis 54 in a direction lying generally along the second axis 58.

A crank 66 extends downwardly from the housing 50 and respective first and second control rods 68, 70 are pivotally coupled to the attachment portion 64 and to the distal end of the crank 66 by attachments 72, 74. These attachments are threadably attached for adjustment of the length of the rods 68, 70. Similarly, attachments 76, 78 are provided at opposite ends of the rods for attachment to respective cranks 80, 82 of a control mechanism indicated generally by the numeral 84.

As also seen in FIG. 2, the control mechanism 84 includes a bearing plate 86 attached to the side 61 and journalling a tubular outer shaft 88. This shaft is also held in a bearing block 90 attached to a valve housing 92 and the crank 82 is attached to this shaft. Similarly, a further crank 94 is attached to the shaft 88 so that any motion transmitted to the crank 82 is reflected in similar movement of the crank 94.

The tubular outer shaft 88 contains an inner shaft 96 which is rotatable in the outer shaft 88 and which has yet another crank 98 attached to an end adjacent the valve housing 92. In order to facilitate assembly, the crank 80 is keyed to the shaft 96 and retained on the shaft by a bolt 100 which is threaded into the end of the shaft.

The valve housing 92 includes valving associated with rods 102, 104 which are coupled by respective links 106, 108 to the cranks 94, 96. Consequently, movement of the cranks 80, 82 results in corresponding movement of the rods 102, 104. As will be described with reference to FIG. 5, the rods 102, 104 are used to control the actuators 46, 48 previously described with reference to FIG. 1.

Reference is now made to FIGS. 2 to 4 to describe the motion imparted by linkage 22 to the cranks 80, 82 of the control mechanism 84. When the attachment portion 64 of the hand lever 52 is in alignment with axis 58, movement of the hand lever 52 is in alignment with axis 58, movement of the hand lever 52 in a fore and aft direction will have no affect on the position of control rod 68. However, because the crank 66 offsets the attachment 74 of rod 70, the rod 70 will be moved as the hand lever rotates about axis 58. Consequently, crank 82 will be moved as indicated in FIG. 3. This Fig. illustrates movement of the hand lever 52 forwardly, and it will be appreciated that rearward movement would result in moving the crank 82 in the opposite angular direction.

If the hand lever 42 is moved transversely about axis 54, then the attachment portion 64 of bracket 62 will move vertically. Effectively, this will change the distance between the attachment portion 64 and crank 80 so that as a result crank 80 will be rotated as is illustrated in FIG. 4. Movement of the hand lever 52 outwardly (with respect to the driver) will cause the crank 80 to move forwardly whereas movement towards the driver will draw the crank 80 rearwardly.

In use, the attachment portion 64 may not lie on the axis 58 so that in such a position when the hand lever 52 is rotated about axis 58, there will be an effect on the crank 80 caused by the offset of the attachment portion 64 with respect to the axis 58. With practice, the operator will find that he can move the hand lever in a direction which includes both fore and aft and transverse components so that if he wishes, he can retain the crank 80 in a constant position although the attachment portion is offset from the axis 58. The purpose of this will be better understood with reference to description of the use of the control linkage as will be described after FIG. 5 has been discussed.

Figure 5:
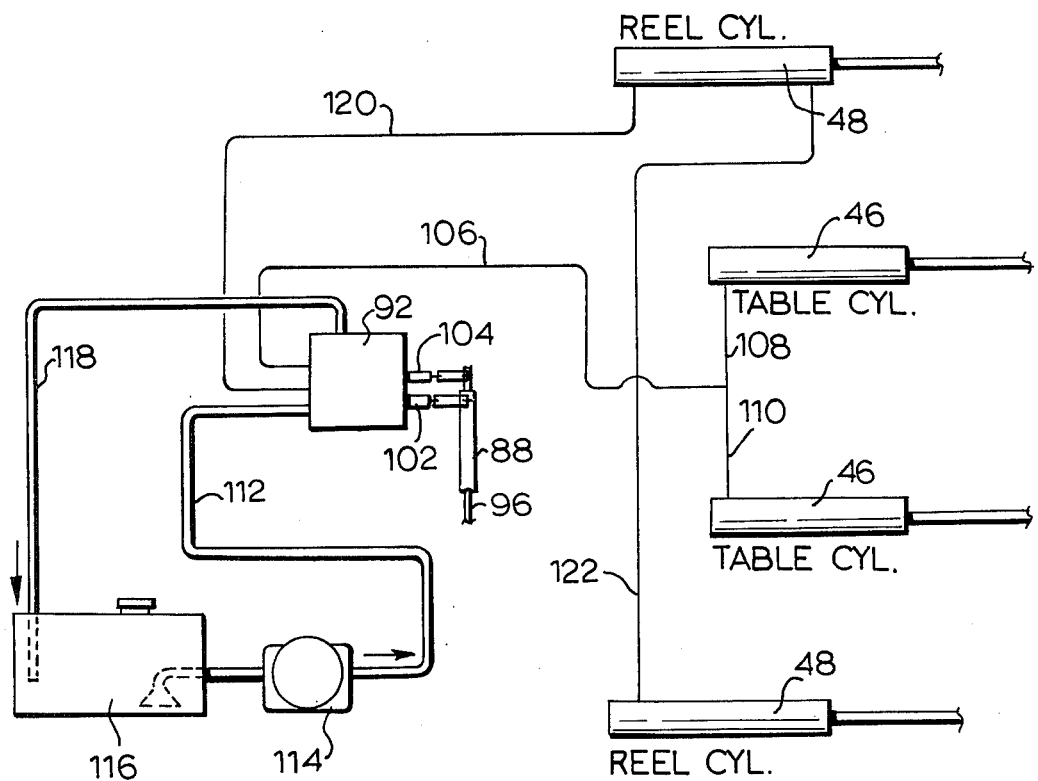
FIG. 5 is a schematic representation of a portion of a hydraulic system associated with the control mechanism which illustrates a swather denoted generally by the numeral 20 and including a preferred embodiment of a control linkage 22.

Reference is now made to FIGS. 1, 2 and 5 with particular reference to FIG. 5 to describe the hydraulic circuit which controls movement of the actuators 46, 48. As seen in FIG. 5 the actuators 46 are fed from a common hydraulic line 106 by way of a pair of branch lines 108, 110. The hydraulic line 106 received hydraulic fluid from valve housing 92. Flow to the pipe 106 is controlled by movement of rod 104, the input of hydraulic fluid being maintained constantly from inlet line 112 which is fed by a pump 114 drawing fluid from a resevoir 116. Overflow fluid is returned continuously to the resevoir by a return line 118.

The actuators 48 are arranged in series. A first of these actuators is fed by a line 120 and displacement from this first actuator causes flow of hydraulic fluid through a line 122 to the other of the actuators. Flow of fluid to the line 120 is controlled by rod 102 and again a continuous overflow returns to resevoir 116 by way of line 118.

It will be apparent from FIGS. 2 and 5 that movement of the hand lever 52 will result in control of the actuators 46, 48. In particular, movement of the hand lever fore and aft results in movement of the rod 102 so that the table is adjusted vertically by the actuators 46. Because the reel is coupled to the table, the spacing between the reel and the table is maintained unless actuators 48 are operated. Similarly, movement of the hand lever 52 transversely will adjust the reel vertically with respect to the table.

In use, an operator will learn to control the reel and table so that he can maintain the spacing between these parts if the crop height is constant. In the event that the crop height varies, he will be able to move the reel vertically with respect to the table to meet this requirement. It is intended that the position of the attachment portion 64 of the hand lever 52 be generally aligned with axis 58 for most positions so that fore and aft movement of the hand lever will have little or no effect on the control rod 68.

What I claim is:

1. A control linkage suitable for use on a swather having a table, a reel, and a control mechanism operable to adjust both the reel and the table vertically, the control linkage comprising:

a housing;

a hand lever pivotally coupled to the housing for angular movement about a first axis;

means adapted to pivotally mount the housing on the swather for manual operation by the operator and for movement about a second axis perpendicular to the first axis;

the hand lever including a bracket having an attachment portion spaced transversely of the first axis in a direction lying generally along the second axis;

a crank attached to the housing and extending outwardly for arcuate movement when the hand lever is moved about the second axis;

first and second control rods;

attachments coupling the first and second control rods respectively to the attachment portion and to the crank, the other ends of the control rods being attachable to the control mechanism so that movement of the hand lever about the first and second axis will move the control rods and thereby cause the control mechanism to maintain the table and the reel at selected heights and in a selected vertical relationship with respect to one another.

2. A swather comprising:

a drive unit;

a table pivotally connected to the drive unit about a transverse, horizontal first axis, the table extending forwardly from the drive unit and including means driven by the drive unit to cut a crop and to move the crop to a central position where the crop is continuously deposited in a swath;

a pair of support arms pivotally coupled to the table about a horizontal second axis parallel to the first axis, the support arms extending forwardly in parallel from the table;

a reel rotatably driven by the drive unit and suspended between the support arms for rotation about a horizontal third axis and located generally above the cutting means, the third axis being parallel to the first and second axes;

first actuator means coupled to the table and to the drive unit to move the table about the first axis so that the height of the table can be adjusted;

second actuator means coupled to the table and to the reel to move the support arms about the second axis so that the vertical spacing between the table and the reel can be adjusted;

a control mechanism coupled to the first and second actuator means for providing energy to operate these actuator means;

a control linkage for use by an operator to selectively operate the control mechanism so that the first and second actuator means are operated as required to control the height of the table and the spacing between the reel and the table, the control linkage comprising: a housing; a hand lever pivotally coupled to the housing for angular movement about a first control axis; means pivotally mounting the housing on the swather for manual operation by the operator and for movement about a second control axis perpendicular to the first control axis; the hand lever including a bracket having an attachment portion spaced transversely of the first control axis in a direction lying generally along a second control axis; a crank attached to the housing and extending outwardly for arcuate movement when the hand lever is moved about the second control axis; first and second control rods;

and attachments coupling the first and second control rods respectively to the attachment portion and to the crank, and further attachments connecting the other ends of the control rods to the control mechanism so that movement of the hand lever about the first and second control axis will move the control rods and thereby cause the said selective operation of the control mechanism.

3. A swather as claimed in claim 2 in which the control mechanism includes first and second shafts and a pair of cranks attached one to each of the shafts, said further attachments being connected to these cranks to rotate the shafts upon operation of the hand lever.

* * * * *